United States Patent [19]

Suzuki et al.

[11] Patent Number: 4,664,997

[45] Date of Patent: May 12, 1987

[54] CRYSTALLINE OXYTITANIUM PHTHALOCYANINE AND PHOTORECEPTOR FOR USE IN ELECTROPHOTOGRAPHY

[75] Inventors: Tetsumi Suzuki, Isehara; Tetsuo Murayama, Machida; Hitoshi Ono, Yokohama; Shigenori Otsuka, Omiya; Mamoru Nozomi, Yokohama, all of Japan

[73] Assignee: Mitsubishi Chemical Industries, Ltd., Tokyo, Japan

[21] Appl. No.: 782,473

[22] Filed: Oct. 1, 1985

[30] Foreign Application Priority Data

Jan. 25, 1985 [JP] Japan .................. 60-12194

[51] Int. Cl.⁴ .............................. G03G 5/06
[52] U.S. Cl. ..................... 430/58; 430/59; 430/78; 540/141
[58] Field of Search ............ 430/58, 59, 76, 78; 260/245.86, 245.87; 540/141

[56] References Cited

U.S. PATENT DOCUMENTS

| | | |
|---|---|---|
| Re. 27,117 | 4/1971 | Byrne et al. |
| 3,155,503 | 11/1964 | Cassiers et al. |
| 3,357,989 | 12/1967 | Byrne et al. |
| 3,816,118 | 6/1974 | Byrne .................. 430/78 X |
| 4,426,434 | 1/1984 | Arishima et al. ........... 430/128 |
| 4,471,039 | 9/1984 | Borsenberger et al. ....... 430/58 |

FOREIGN PATENT DOCUMENTS

| | | | |
|---|---|---|---|
| 57-148745 | 9/1982 | Japan | .................. 430/78 |
| 49544 | 3/1984 | Japan | . |
| 166959 | 9/1984 | Japan | . |

*Primary Examiner*—Roland E. Martin
*Attorney, Agent, or Firm*—David G. Conlin; George W. Neuner

[57] ABSTRACT

Disclosed is a crystalline oxytitanium phthalocyanine which shows intense diffraction peaks at Bragg angles $(2\theta \pm 0.2°)$ of 9.3°, 10.6°, 13.2°, 15.1°, 15.7°, 16.1°, 20.8°, 23.3°, 26.3° and 27.1° in the X-ray diffraction spectrum, the intensity of the diffraction peak at Bragg angle of 26.3° being most strong and the intensity of the diffraction peaks at Bragg angles between 4°–8° being less than 5% of the intensity of the diffraction peak at Bragg angle of 26.3°. Further, disclosed is a photoreceptor for use in electrophotography, comprising at least a charge carrier generation layer in which the oxytitanium phthalocyanine above is dispersed in a binder polymer and a charge carrier transport layer laminated thereon.

2 Claims, 8 Drawing Figures

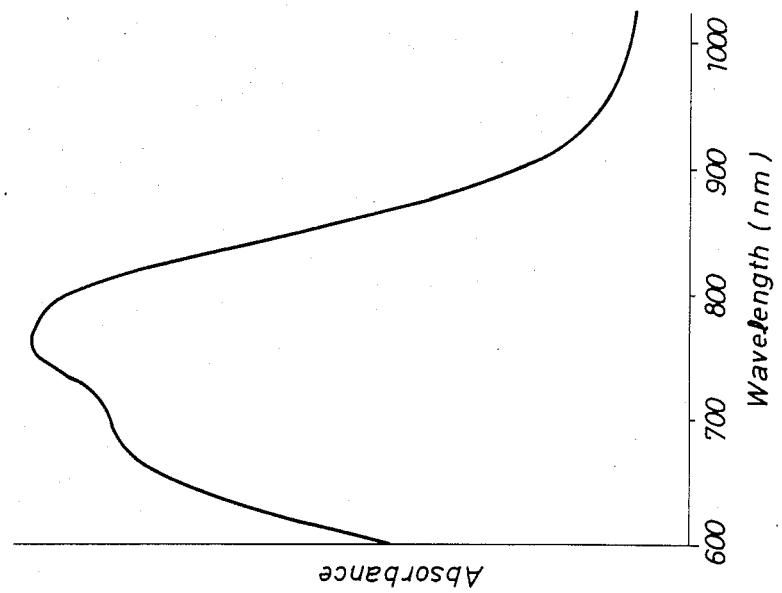
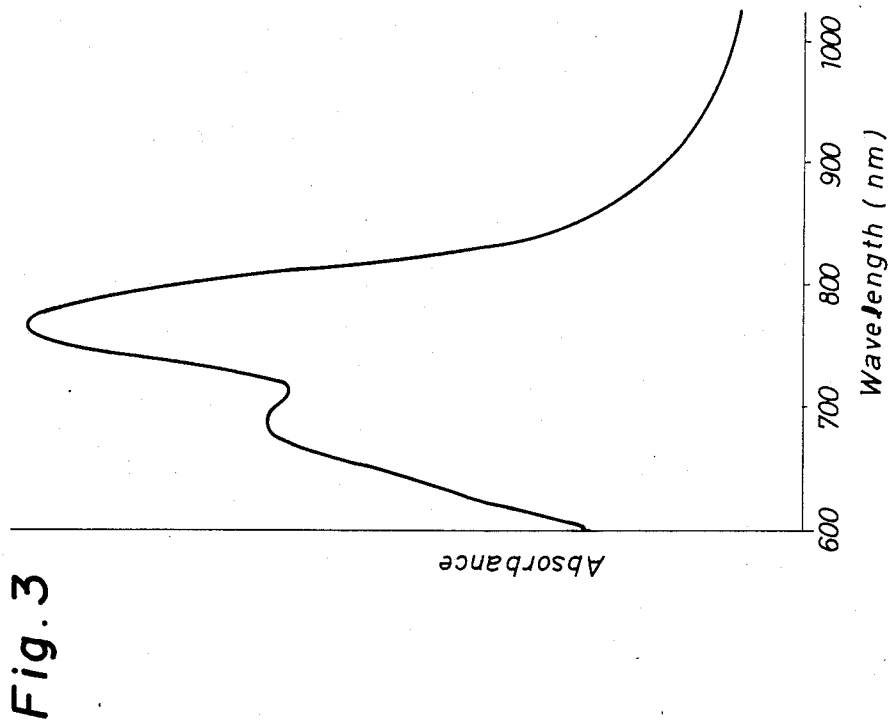

4,664,997

CRYSTALLINE OXYTITANIUM PHTHALOCYANINE AND PHOTORECEPTOR FOR USE IN ELECTROPHOTOGRAPHY

FIELD OF THE INVENTION

This invention relates to an oxytitanium phthalocyanine of a specific crystal form and a photoreceptor for use in electrophotography, the charge carrier generation layer of which is incorporated with the same oxytitanium phthalocyanine compound.

BACKGROUND OF THE INVENTION

Phthalocyanines and metal phthalocyanines show satisfactory photoconductivity and they have been used, for example, in the electrophotographic photoreceptors.

Along with the recent prevalency of laser beam printer or the like using laser beam as a light source instead of conventional incandescent light and providing advantages of increased printing speed, higher image quality and non-impact printing, investigations and developments for the photoreceptors capable of fulfilling the requirements therefor are now in flourish.

Various attempts have been made for using as the optical source semiconductor laser which has remarkably been developed in recent years among other laser beams. In this case, since the wavelength of the semiconductor laser is around 800 nm, those photoreceptors having high sensitivity at the longer wavelength light of around 800 nm are highly demanded.

As the organic photoconductive materials satisfying such requirements, there have been known squaric acid methine dye, cyanine dye, pyrylium dye, thiapyrylium dye, polyazo dye and phthalocyanine dye. Among them, squaric acid methine dye, cyanine dye, pyrylium dye and thiapyrylium dye are deficient in the practical stability such as the repeating use, although it is relatively easy to make them sensitive to the longer wavelength. The polyazo dye has a drawback in that it is difficult to make it possible to absorb the ray of longer wavelength, many steps are required for the production thereof and moreover the separation of impurities is difficult.

While on the other hand, phthalocyanine dye has absorption peaks at the longer wavelength region of higher than 600 nm and the spectral sensitivity may be changed depending on the central metals or crystal forms thereof. Several of them show a high sensitivity at the wavelength region of the semiconductor laser, and research and development on the phthalocyanine dye have extensively been conducted.

The absorption spectrum and the photoconductive property of phthalocyanines are varied not only by the kind of the central metal but also depending on the crystal forms. It has been reported that a specific crystal form of phthalocyanine is selected among those having the same central metal and used as the photosensitive material for use in electrophotography.

The metal-free phthalocyanine was reported that its X-crystal form had high photoconductive property and was sensitive also to the wavelength region of higher than 800 nm, and copper phthalocyanine was reported that its ε-crystal form was sensitive to the longest wavelength region among many crystal forms thereof. However, the X-form metal-free phthalocyanine which is meta-stable, is difficult to prepare and the crystalline product of stable and constant quality can not be obtained with ease. ε-form copper phthalocyanine has a spectral sensitivity extended toward the longer wavelength region as compared with α- and β-copper phthalocyanines, but its sensitivity is abruptly reduced at 800 nm as compared with that at 780 nm and accordingly, it is accompanied with some difficulties in applying the present semiconductor laser which is fluctuating in the lasing wavelength.

In view of the above, many metal phthalocyanines have been examined, and oxyvanadium phthalocyanine, chloroaluminum phthalocyanine, chloroindium phthalocyanine, oxytitanium phthalocyanine, chlorogallium phthalocyanine and magnesium phthalocyanine, etc. have been reported as phthalocyanines having high sensitivity to near infrared light such as the semiconductor laser beam. However, upon using these phthalocyanines as the charge generation material of photoreceptor for use in electrophotography in copying machines or printers, various requirements for the excellent performance have to be met in addition to the sensitivity.

Of the electrical properties, in addition to the high sensitivity to the semiconductor laser beam, superior charge acceptance, small dark decay and low residual potential are required at first and, further, it is required that these properties do not substantially change during repeating use. Particularly, longer duration life of the photoreceptor has recently been considered important and it has been highly demanded that the electrical properties are less varied during the repeating use. In view of the above, no quite satisfactory material has yet been provided.

While the electrical property varies greatly with the metal coordinated to phthalocyanine, the difference in the crystal forms of the identical phthalocyanine also gives a significant change in the electrical properties. For instance, it has been well known for the copper phthalocyanine that there is a great difference in the charge acceptance, dark decay, sensitivity and the like depending on the crystal forms such as α, β, γ, ε, etc. (Manabu Sawada; Dyestuffs and Chemicals, Vol. 24, No. 6, p 122 (1979)). Further, the spectral sensitivity also changes as the absorption spectrum varies depending on the crystal forms and, among the copper phthalocyanines, ε-form has the absorption spectrum at the longest wavelength and the spectral sensitivity extended to the longest wavelength region (Isao Kumano; Electrophotography, Vol. 22, No. 2, p 111 (1984)). Such differences in the electrical properties depending on the crystal forms have been known as well in the metal-free phthalocyanine and many other metal phthalocyanines, and much investigatory effort have been made to the preparation of crystal forms with preferred electrical property.

For instance, while a charge carrier generation layer is often prepared from the vapor-deposition film of the metal phthalocyanine, examples of improving the electrical property of the vapor-deposition film by immersing them into an organic solvent such as dichloromethane or tetrahydrofuran or exposing them to the solvent vapor to cause crystal transition have been reported with regard to aluminum, indium and titanium phthalocyanines (refer to each of Japanese Patent Application Laid-Open Nos. 158649/1983, 44054/1984, 49544/1984, 155851/1984 and 166959/1984).

Among them, it is described in Japanese Patent Application Laid-Open Nos. 49544/1984 and 166959/1984 that the oxytitanium phthalocyanine of particular crystal form is applied to the photoreceptor for use in electrophotography. More in detail, Japanese Patent Application Laid-Open No. 49544/1984 describes that oxytitanium phthalocyanine of a crystal form that has intense X-ray diffraction peaks at Bragg angles ($2\theta \pm 0.2°$) of 9.2°, 13.1°, 20.7°, 26.2° and 27.1° is preferred. An X-ray diffraction spectrum chart is shown, in which several other peaks can be seen and the presence of a peak having the intensity next to the aboves is shown in the range from 7° to 8°.

In Japanese Patent Application Laid-Open No. 166959/1984, the charge carrier generation layer is prepared by exposing the vapor-deposition film of the oxytitanium phthalocyanine to a saturated vapor of tetrahydrofuran for 1-24 hours to cause the crystal transition. The X-ray diffraction spectrum thereof indicates that peaks are present by few number and have broad width, and that intense diffraction peaks are shown at Bragg angles ($2\theta$) of 7.5°, 12.6°, 13.0°, 25.4°, 26.2° and 28.6°.

The charge carrier generation layer is formed with these known oxytitanium phthalocyanines mainly by way of vapor-deposition, and the charge generation layer capable of serving to practical use can be prepared only by the procedure of causing crystal transition by exposing the vapor-deposition layer to solvent vapors. However, the vapor-deposition process is not preferred since it requires a higher installation cost and further an increased running cost due to the poor mass productivity as compared with a coating process.

According to the study of the present inventors, it has been found that, in the case of using the oxytitanium phthalocyanine having strong diffraction peaks at Bragg angle of less than 8°, the performance of the photoreceptor having the charge carrier generation layer prepared particularly by the coating of the disperse solution thereof is not always satisfactory. This can be seen, for example, also in Example of Japanese Patent Application Laid-Open No. 49544/1984. That is, the photoreceptor formed by the coating has a lower charge acceptance, higher residual potential and a sensitivity reduced by about 40% as compared with those of the photoreceptor formed by the vapor-deposition.

The performance of the photoreceptor using oxytitanium phthalocyanine is thus changed depending on the preparation conditions, because the oxytitanium phthalocyanine has several crystal forms, depending on which the electrical properties are varied.

Accordingly, it is particularly required to examine the method of preparing such crystal form as having satisfactory electrical properties. However, the prior study has mainly directed to the vapor-deposition process of poor mass productivity and not to the preparation conditions for the oxytitanium phthalocyanine of crystal form suitable to the coating process.

In view of the above, the present inventors have made an earnest study and already proposed that the oxytitanium phthalocyanine prepared by suspending dichlorotitanium phthalocyanine in hot water followed by treating with N-methylpyrrolidone was suitable to the coating process (Japanese Patent Application No. 230982/1984).

The oxytitanium phthalocyanine prepared by such a purifying process generally exhibits preferred electrical property more than that obtained by the conventional method. However, as a result of further study of the present inventors, it has been confirmed that at least several types of crystal forms are formed depending on the purification conditions and there is a difference in electrical property also among these crystal forms.

According to the study of the present inventors, it has been found that a crystalline oxytitanium phthalocyanine showing a specific X-ray diffraction pattern which is prepared, particularly, by applying sufficient washing by suspension in hot water till the pH value of the filtrate is adjusted to about 5-7 and further carrying out the treatment with N-methylpyrrolidone sufficiently till the intensity of peaks at Bragg angles of between 4°-8° is reduced to a certain level, is particularly satisfactory in the sensitivity, charge acceptance, dark decay, residual potential and the like and, thus, has well balanced electrical properties. This invention has been accomplished on the basis of the above-mentioned findings.

The object of the present invention is to provide an oxytitanium phthalocyanine of specific crystal form highly sensitive to the near infrared light such as the semiconductor laser beam, excellent in electrical properties and producible without difficulty.

The other object of the invention is to provide a photoreceptor for electrophotography using oxytitanium phthalocyanine mentioned above, which is highly sensitive to the longer wavelength light of around 750 to 800 nm and has preferred electrical properties.

Other objects of this invention will be apparent from the descriptions hereinafter.

BRIEF DESCRIPTION OF THE DRAWINGS

FIGS. 1 and 3 show X-ray diffraction spectrum and absorption spectrum, respectively, of crystalline oxytitanium phthalocyanine having the specific crystal form in accordance with the invention, which is prepared in Preparation Example 1.

FIGS. 2 and 4 show X-ray diffraction spectrum and absorption spectrum, respectively, of a sample after suspension treatment in hot water in same Preparation Example 1.

SUMMARY OF THE INVENTION

Figure 1:
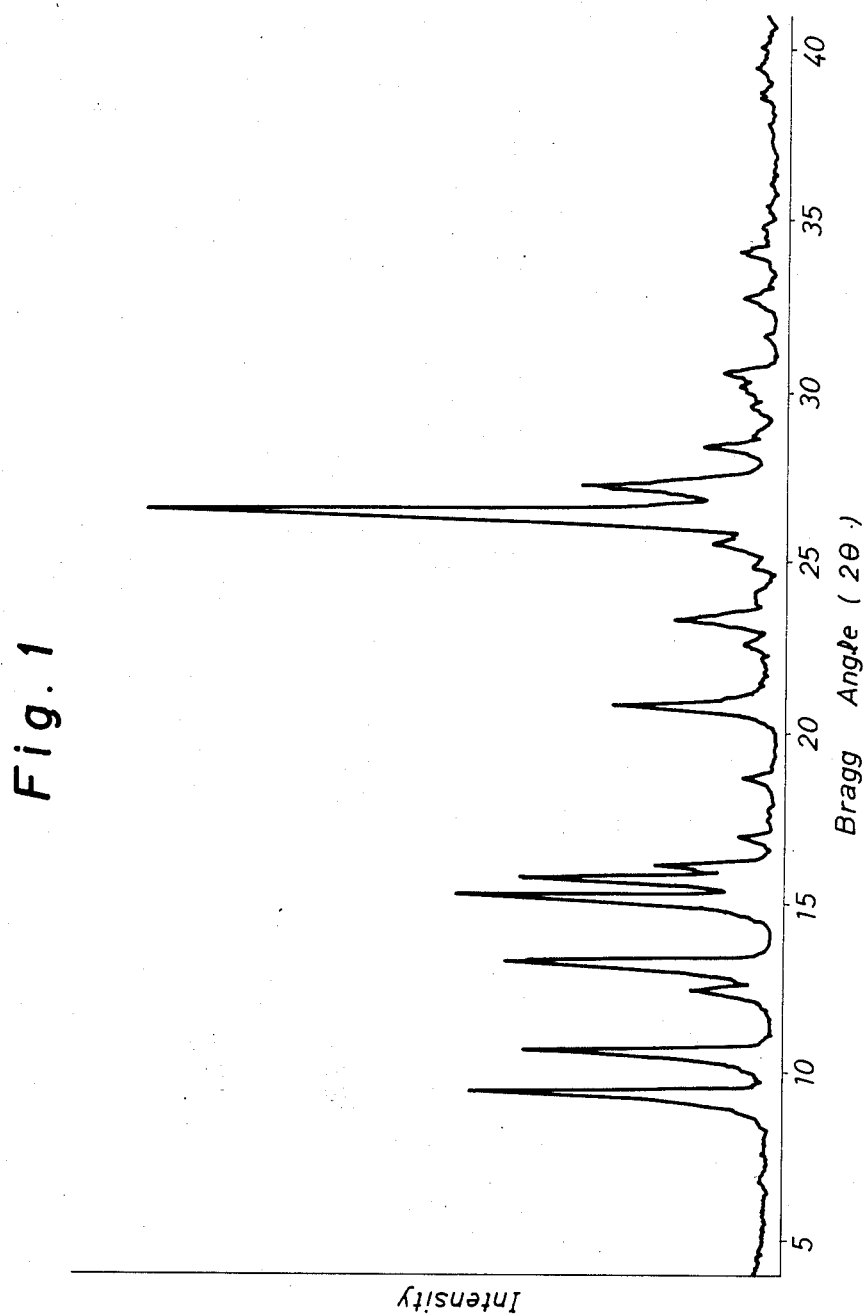

One aspect of this invention resides in a crystalline oxytitanium phthalocyanine which shows intense diffraction peaks at Bragg angles ($2\theta \pm 0.2°$) of 9.3°, 10.6°, 13.2°, 15.1°, 15.7°, 16.1°, 20.8°, 23.3°, 26.3° and 27.1° in the X-ray diffraction spectrum, the intensity of the diffraction peak at Bragg angle of 26.3° being most strong and the intensity of the diffraction peaks at Bragg angles of between 4°-8° being less than 5% of the intensity of the diffraction peak at Bragg angle of 26.3°.

The other aspect of this invention resides in a photoreceptor for use in electophotography comprising at least a charge generation layer in which the oxytitanium phthalocyanine hereinbefore mentioned is dispersed in a binder polymer and a charge transport layer laminated thereon.

DETAILED DESCRIPTION OF THE INVENTION

The oxytitanium phthalocyanine according to the present invention has the specific crystal form which is characterized by the intense X-ray diffraction peaks at Bragg angles (2θ±2°) of 9.3°, 10.6°, 13.2°, 15.1°, 15.7°, 16.1°, 20.8°, 23.3°, 26.3° and 27.1° in the X-ray diffraction pattern. The diffraction peak at Bragg angle of 26.3° is most strong among those diffraction peaks and the diffraction peaks at 7.0° and 7.6° are very weak and have the intensity less than 5% of that of the diffraction peak at Bragg angle of 26.3°.

As the oxytitanium phthalocyanine, there can be mentioned, for example, those represented by the following general formula I:

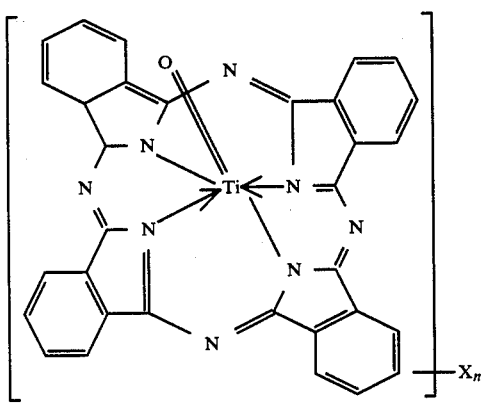

wherein X is a hologen atom and n is a number from 0 to 1.

Those represented by the general formula I wherein X is a chlorine atom and n is a number from 0 to 0.5 are preferred.

The oxytitanium phthalocyanine according to this invention may be synthesized without difficulty, for example, from 1,2-dicyanobenzene (o-phthalodinitrile) and a titanium compound in accordance with the following reaction scheme (1) or (2):

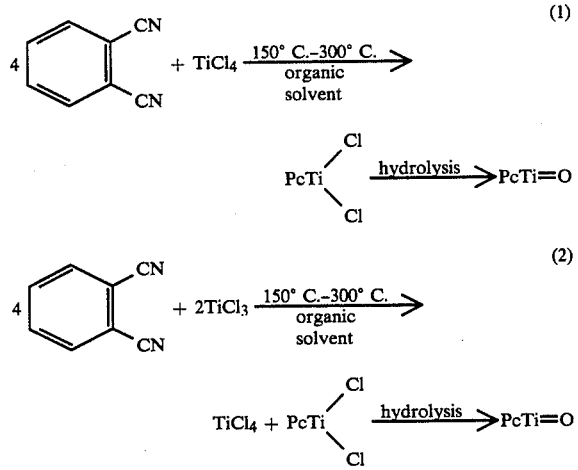

wherein Pc is a phthalocyanine residue.

That is, 1,2-dicyanobenzene (phthalodinitrile) and titanium halide are heated to react in an inert solvent.

Titanium compound herein mentioned includes titanium tetrachloride, titanium trichloride, titanium tetrabromide and the like, titanium tetrachloride being preferred in view of the cost.

Preferred inner solvents are those high boiling organic solvents inert to the reaction such as trichlorobenzene, α-chloronaphthalene, β-chloronaphthalene, α-methylnaphthalene, methoxynaphthalene, diphenyhl ether, diphenylmethane, diphenylethane, ethylene glycol dialkyl ether, diethylene glycol dialkyl ether and triethylene glycol dialkyl ether.

Preferred reaction temperature is usually from 150°–300° C. and, particularly, from 180° to 250° C.

After the reaction is over, the dichlorotitanium phthalocyanine is collected by filtration, washed with the same solvent as in the reaction to remove impurities formed during the reaction and unreacted starting materials. Then, it is further washed with an inert solvent such as an alcohol, for example, methanol, ethanol and isopropanol and an ether, for example, tetrahydrofuran and 1,4-dioxane to remove the solvent used in the reaction.

In this case, it is preferred to wash the hot reaction product with the reaction solvent heated to about 100° C. followed by the reaction solvent at about room temperature and further, washed with the inert solvent such as methanol at about room temperature and then with the heated same inert solvent, thereby the oxytitanium phthalocyanine of preferred electrical properties, particularly, with a reduced residual potential may be obtained.

Then, the dichlorotitanium phthalocyanine thus obtained is converted to the oxytitanium phthalocyanine by treating in hot water. It is desired that the hot water treatment is repeated until the pH of the washing filtrate changes to about 5 to 7.

In the X-ray diffraction spectrum of the oxytitanium phthalocyanine obtained in this stage, the peaks are relatively broad, which indicates that disorder of crystal arrangement is resulted during the hydrolysis reaction of replacing chlorine atoms to oxygen atom. Then, the oxytitanium phthalocyanine is treated under heating with an organic solvent such as quinoline, α-chloronaphthalene, N-methylpyrrolidone and the like, preferably, with N-methylpyrrolidone.

The treatment with the organic solvent is usually carried out at a temperature from 100° to 180° C., preferably, from 130° to 170° C., in an amount of the solvent from 1 to 100 times by weight, preferably, from 5 to 20 times by weight of the oxytitanium phthalocyanine. If diffraction peaks at a certain degree of intensity are still present at Bragg angles less than 8° in the X-ray diffraction spectrum of the oxytitanium phthalocyanine after the organic solvent treatment, a sufficient treatment by the above-mentioned organic solvent and, is applied repeatedly until the intensity of the diffraction peaks specified in this invention can be attained. In this way, the oxytitanium phthalocyanine of the crystal form according to the invention can be obtained.

The photoreceptor according to this invention will now be explained more specifically. The photoreceptor is a dual layer photoreceptor in which a charge carrier generation layer and a charge carrier transport layer are laminated, and it comprises at least a conductive substrate, the charge carrier generation layer and the charge transport layer. Though the charge carrier transport layer is usually laminated over the charge carrier generation layer formed on the conductive substrate, the structure may be reversed. In addition, an intermediate layer such as an adhesive layer, blocking layer, and a protective layer which improve the electric properties and mechanical properties may be formed.

As the conductive substrate, well-known materials employed in the electrophotographic photoreceptor may be used. Indicatively, they include drums, sheets of metals such as aluminum, stainless steel and copper, or foil laminates and deposition products of these metal. Further, there can be also mentioned plastic films, plastic drums, papers and paper tubes which become conductive by coating a conductive material such as metal powder, carbon black, copper iodide and polymeric electrolyte together with an appropriate binder. Moreover, plastic sheets or drums rendered electroconductive by the incorporation of conductive materials such as metal powder, carbon black and carbon fibers can also be mentioned. In addition, plastic films or belts treated with a conductive metal oxide such as tin oxide and indium oxide may be mentioned.

The charge carrier generation layer may be formed on the conductive substrate as described above by coating and drying, a coating solution prepared by dissolving or dispersing the oxytitanium phthalocyanine particles of the invention and a binder polymer, optionally, with organic photoconductive compounds, dyes, electron accepting compounds or the like in a solvent.

As the binder, there can be mentioned polymers and copolymers of vinyl compounds such as styrene, vinyl acetate, vinyl chloride, acrylic acid ester, methacrylic acid ester, vinyl alcohol and ethyl vinyl ether, polyvinyl acetal, polycarbonate, polyester, polyamide, polyurethane, cellulose ester, cellulose ether, phenoxy resin, silicon resin and epoxy resin.

While there is no particular restriction on the mixing ratio between the oxytitanium phthalocyanine and the binder polymer, the binder polymer is generally used in an amount from 5 to 500 parts by weight, preferably, from 20 to 300 parts by weight based on 100 parts by weight of the oxytitanium phthalocyanine. The thickness of the charge generation layer is from 0.05 to 5 $\mu$m, preferably, from 0.1 to 2 $\mu$m.

The charge carrier transport layer to which charge carriers are injected from the charge carrier generation layer contains a charge carrier transport material having a high charge carrier injection efficiency and a high transport efficiency. As the charge carrier transport material, there can be mentioned a polymeric compound having on the side chain thereof heterocyclic group or polycondensed aromatic group such as poly-N-vinyl carbazole and polystyryl anthracene, as well as monomeric compound such as heterocyclic compound, for example, pyrazoline, imidazole, oxazole, oxadiazole, triazole and carbazole, triarylalkane derivative, for example, triphenylmethane, triarylamine derivative, for example, triphenylamine, phenylenediamine derivative, N-phenyl carbazole derivative, stilbene derivative and hydrazone compound. High electrodonating compound having electrodonating group such as substituted amino or alkoxy group or aromatic ring group having these substituents are particularly mentioned. Further, a binder polymer may be incorporated into the charge carrier transport layer, if required. Preferred binder polymers are those having a good compatibility with the charge carrier transport material so that the charge carrier transport material neither crystallizes nor results in the phase separation after the formation of the coating film. For example, there can be mentioned polymers and copolymers of vinyl compounds such as styrene, vinyl acetate, vinyl chloride, acrylic acid ester, methacrylic acid ester and butadiene, polyvinyl acetal, polycarbonate, polyester, polysulfone, polyphenylene oxide, polyurethane, cellulose ester, cellulose ether, phenoxy resin, silicon resin and epoxy resin.

In the case where the charge carrier transport material is the polymeric compound, although there is no particular need to add the binder polymer, it may be mixed for the improvement of flexibility or the like. In the case where the material is the monomeric compound, the binder polymer is mixed for providing the film forming property in an amount usually ranging from 50 to 3,000 parts by weight, preferably, from 70 to 1000 parts by weight based on 100 parts by weight of the charge carrier transport material. In addition, various additives may be incorporated into the charge carrier transport layer for the improvement in the mechanical strength and the durability of the coated film. As such additives, there can be mentioned well-known plasticizer, various stabilizers, fluidifying agents, cross-linkers and the likes.

The photoreceptor for use in electrophotography having the charge generation layer in which the oxytitanium phthalocyanine of the specific crystal form according to this invention is dispersed in the binder polymer prepared as described above has a high sensitivity, a low residual potential and a high charge acceptance, as well as shows less changes during repeating use and, particularly, has satisfactory charging stability giving an effect on the image density and, accordingly, it can be used as a high durable photoreceptor. Further, since the sensitivity in the region from 750 to 800 nm is high, the photoreceptor is particularly suitable for the semiconductor laser printer.

This invention is further described specifically with referring to Preparation Examples, Examples and Comparative

EXAMPLES

PREPARATION EXAMPLE 1

Phthalodinitrile (97.5 g) was added to 750 ml of $\alpha$-chloronaphthalene and then 22 ml of titanium tetrachloride was added dropwise to the solution under nitrogen atmosphere. After the addition was over, the temperature was increased and they were reacted under stirring at 200°–220° C. for 3 hours. Then, the reaction system was left to cool and filtered while hot at 100°–130° C. and then washed with 200 ml of $\alpha$-chloronaphthalene heated to 100° C. Crude cakes thus obtained were washed while suspended in 300 ml of $\alpha$-chloronaphthalene and then in 300 ml of methanol at room temperature followed by further washing by hot suspension for several times in 800 ml of methanol for one hour. The cakes thus obtained were suspended in 700 ml of hot water for 2 hours. The pH of the filtrate was lower than 1. The washing by hot water suspension was repeated until the pH of the filtrate was increased to 6–7. Thereafter, the filtered precipitate was washed by hot suspension in 700 ml of N-methylpyrrolidone (manufactured by Mitsubishi Chemical Industries Ltd.) at 140°–145° C. for 2 hours, and the procedures were repeated for four times. Then, another washing by hot suspension was repeated two times in 800 ml of methanol. The yield was 76.6 g.

The oxytitanium phthalocyanine obtained had an elemental analytical values as below:

Elemental analytical value $C_{32}H_{16}N_8TiO$ ):

|  | C | H | N | Cl | Ash (as TiO$_2$) |
|---|---|---|---|---|---|
| calculated (%) | 66.68 | 2.80 | 19.44 | 0 | 13.86 |
| found (%) | 66.35 | 3.00 | 19.42 | 0.49 | 13.80 |

The X-ray diffraction spectrum of the oxytitanium phthalocyanine is shown in FIG. 1.

As can be seen from FIG. 1, there are no peaks at Bragg angles ($2\theta \pm 0.2°$) from 4° to 8° and there are intense diffraction peaks at 9.3°, 10.6°, 13.2°, 15.1°, 15.7°, 16.1°, 20.8°, 23.3°, 26.3° and 27.1°, among which the peak at 26.3° is most intense. This crystal form is defined as form I.

Figure 2:
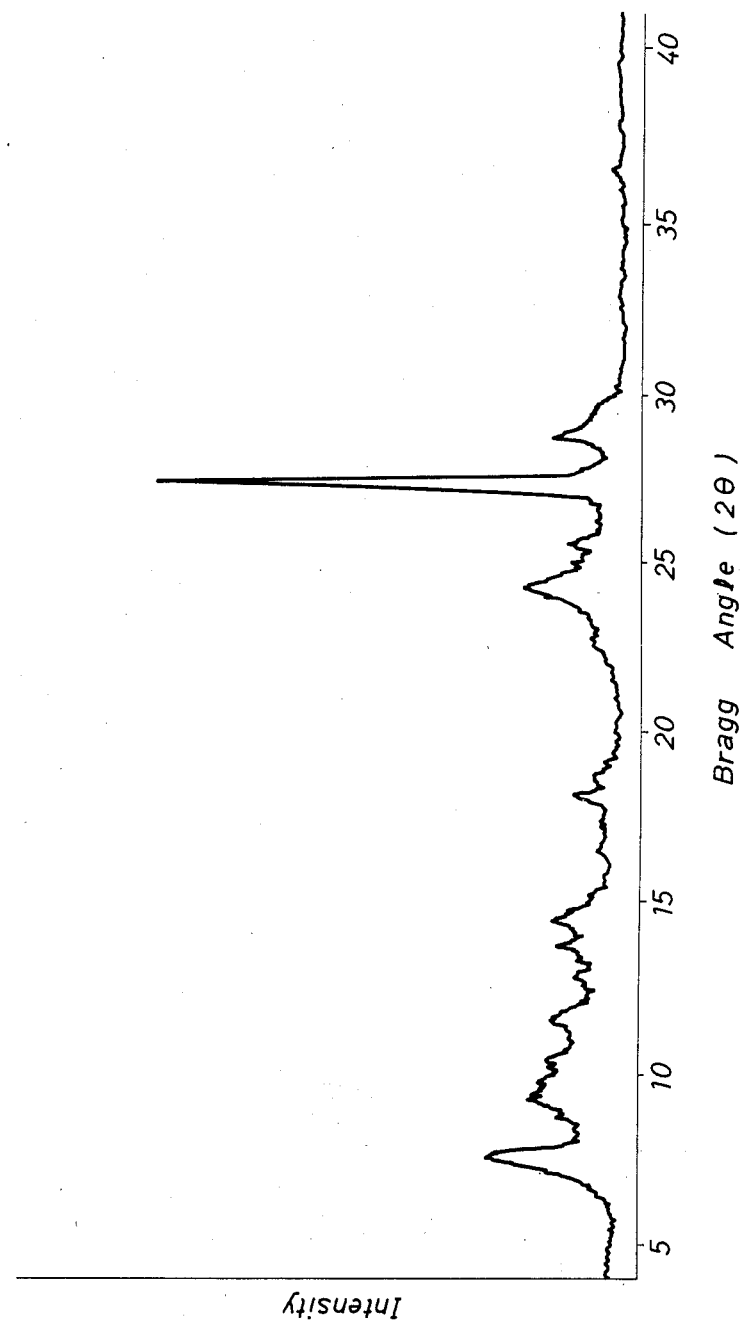

In order to show that the crystal form I was resulted in the preparing step, the X-ray diffraction spectrum in the course of the step was measured. FIG. 2 shows the spectrum of the sample (Form II) after the washing by hot water suspension. Although a sharp peak appears at 27.3° in FIG. 2, other peaks are all broad, showing that the crystallinity was disordered by the hydrolysis reaction.

Rearrangement of molecules is effected on the crystals of this stage upon washing by hot suspension with N-methylpyrrolidone and the crystal form II is converted into form I, according to this invention, where the peak at 26.3° which has not been shown in FIG. 2 is most strong and broad peaks appearing from 7° to 8° in FIG. 2 are eliminated.

Then, for measuring the absorption spectrum of the oxytitanium phthalocyanine, a dispersion liquid of oxytitanium phthalocyanine was prepared by the method of Example 1 hereinafter described, which was coated to dry on a polyester film of 100 μm in thickness to form a dispersion layer of the oxytitanium phthalocyanine dye.

FIG. 3 shows the absorption spectrum of form I cyrstal and FIG. 4 shows the absorption spectrum of form II crystal.

PREPARATION EXAMPLE 2

Figure 5:
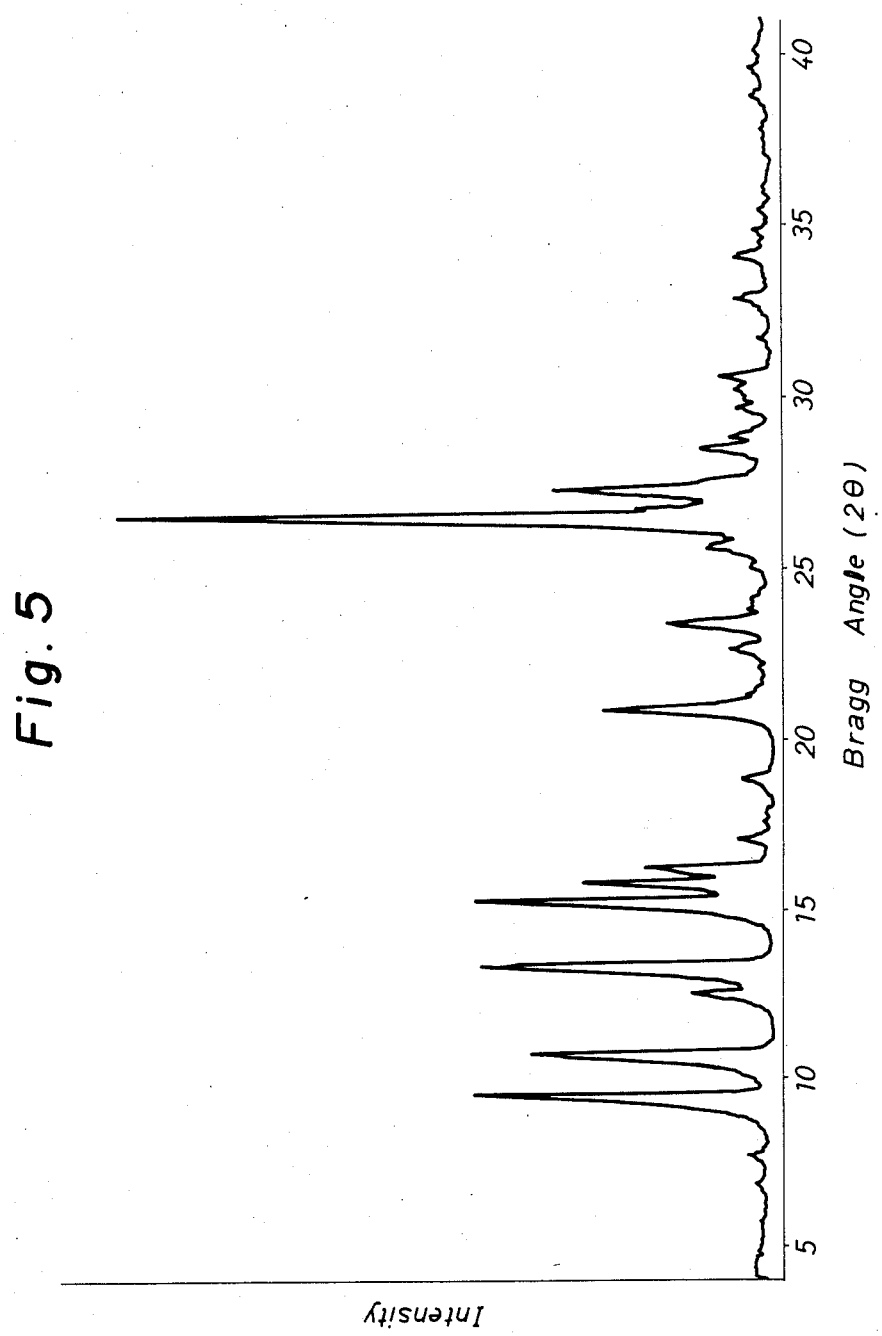
FIGS. 5 and 6 show X-ray diffraction spectrum of the oxytitanium phthalocyanine having the specific crystal form in accordance with the invention, which is prepared in Preparation Examples 2 and 3, respectively.

Oxytitanium phthalocyanine was prepared in the same manner as in Preparation Example 1 except for continuing the reaction for three hours at a reaction temperature of 225° C. The X-ray diffraction spectrum of the product was measured and shown in FIG. 5. It was substantially the same as that of Preparation Example 1 (FIG. 1), provided that weak peaks were measured at $2\theta = 6.7°$ and 7.6°. The intensity of the weak peaks were 1.4% and 2.6%, respectively, of the intensity of the most strong peak at 26.3°.

PREPARATION EXAMPLE 3

Oxytitanium phthalocyanine of crystal form II was prepared by the hot water treatment in the same manner as in Preparation Example 1. 5 g of the oxytitanium phthalocyanine were washed by hot suspension in 100 ml of quinoline at a temperature of 140° to 145° C. for 2 hours. The procedures were repeated for four times. Further, washing by hot suspension was carried out twice in methanol at a temperature from 60° to 65° C. for one hour.

Figure 6:
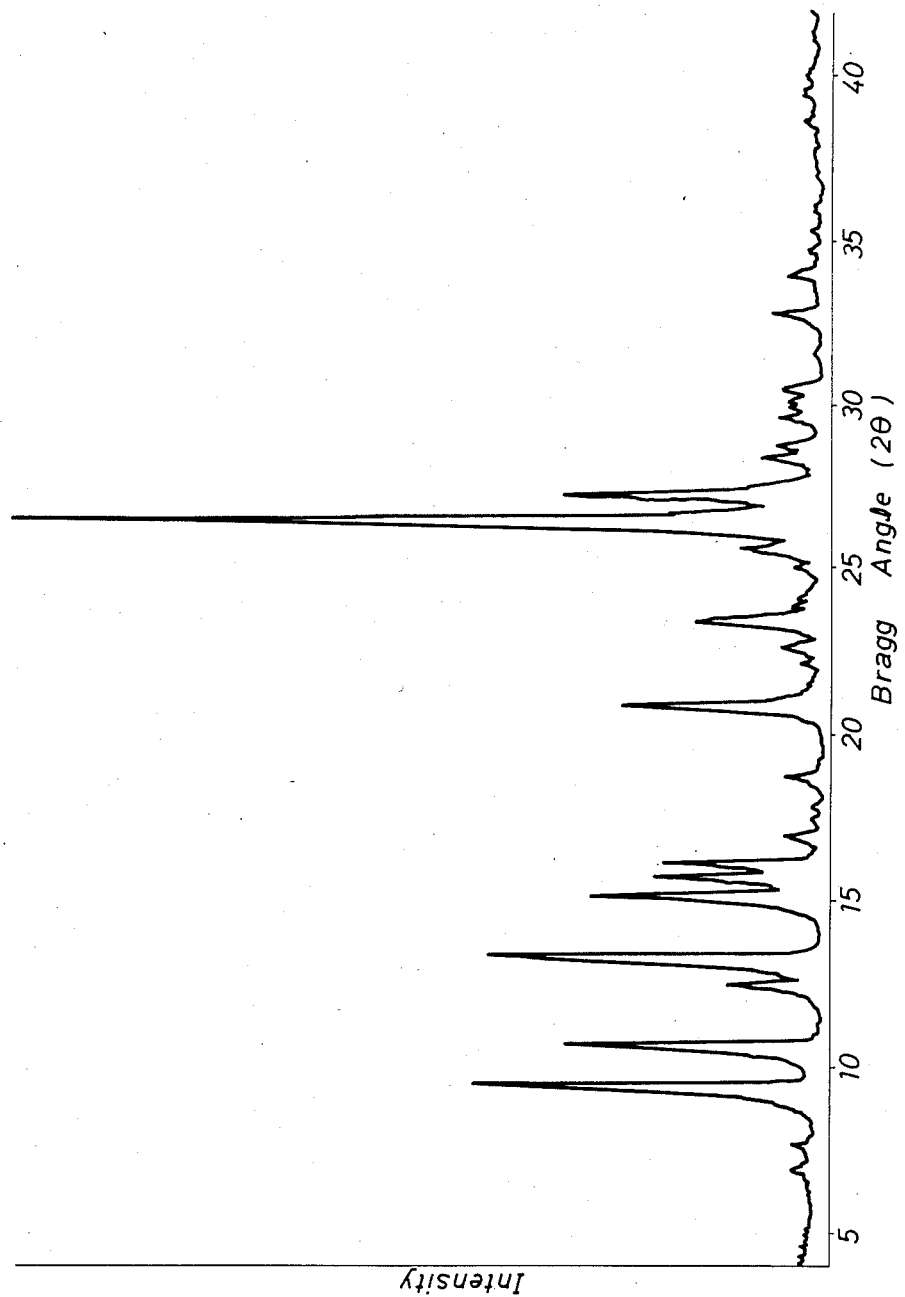

The X-ray diffraction spectrum of the oxytitanium phthalocyanine thus prepared was shown in FIG. 6. The crystal form shows the similar spectrum to that of crystal form I. Weak peaks were observed at Bragg angles of 6.9° and 7.6°. The intensities of these peaks were of 2.2% and 2.0%, respectively, of the peak at 26.3°.

PREPARATION COMPARATIVE EXAMPLE 4

Phthalodinitrile (46 g) was added into 250 ml of α-chloronaphthalene and after dissolving by heating, 10 ml of titanium tetrachloride was added dropwise and stirred at 150° C. for 30 minutes. Then, the temperature was gradually increased and stirring was continued under heating at 220° C. for 2 hours. After that, the reaction system was left to cool under stirring, filtered when the temperature was lowered to 100° C., and subjected to hot suspension in methanol and in boiling water each for one time. The pH of the filtrate was less than 1. Then it was subjected to hot suspension with N-methylpyrrolidone at 120° C. for one hour, filtered while hot and subsequently subjected to the hot suspension with methanol followed by filtered and dried under a reduced pressure to obtain 29.5 g of oxytitanium phthalocyanine as blue powder. The compound had the elemental analytical values as shown below.

Elemental analytical value ($C_{32}H_{16}N_8TiO$):

|  | C (%) | H (%) | N (%) | Cl (%) |
|---|---|---|---|---|
| calculated | 66.68 | 2.80 | 19.44 | — |
| found | 66.49 | 3.02 | 19.35 | 0.85 |

Figure 7:
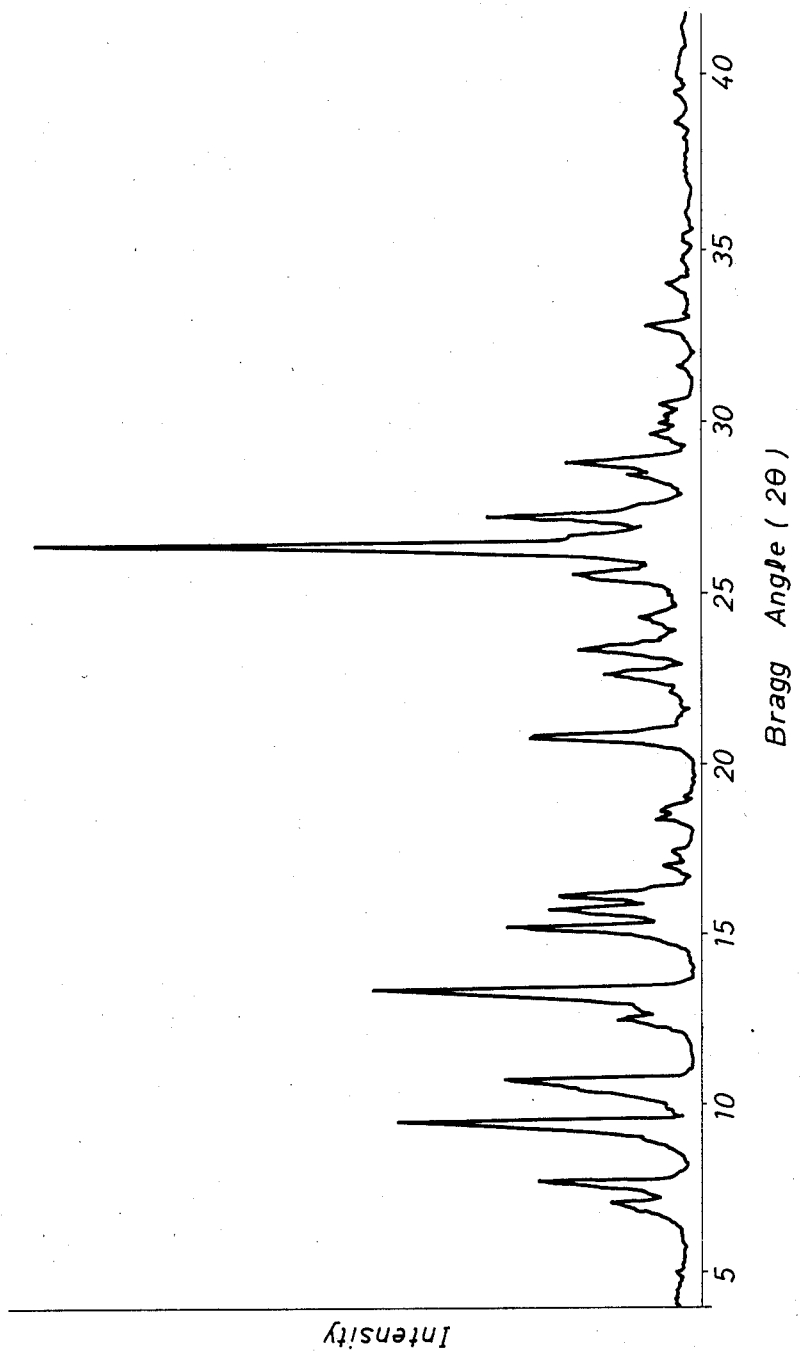
FIG. 7 shows X-ray diffraction spectrum of the oxytitanium phthalocyanine prepared in Preparation Comparative Example 4.

FIG. 7 shows the X-ray diffraction spectrum of the oxytitanium phthalocyanine thus prepared. Diffraction peaks are observed at Bragg angles of 7.0° and 7.6°. The intensity ratios of these peaks to that of the peak 26.3° were 10.9 % and 23.6%, respectively.

EXAMPLE 1

A charge carrier generation layer was formed by dispersing 0.4 g of oxytitanium phthalocyanine as prepared in Preparation Example 1 and 0.2 g of polyvinylbutyral together with 30 g of 4-methoxy-4-methyl-2-pentanone by means of a sand grinder and coating the mixture on a vapor-deposited aluminum layer on a polyester film by means of a film applicator and drying. The dry film thickness of the charge carrier generation layer was 0.3 g/m$^2$. A charge carrier transport layer of 17.5 μm in thickness, which comprises 90 parts of 4-N,N-diethylaminobenzaldehyde diphenylhydrazone and 100 parts of polycarbonate resin (NOVAREX 7025A, manufactured by Mitsubishi Chemical Industries Ltd.), was formed on the charge carrier generation layer to obtain a photoreceptor for use in electrophotography.

For evaluating the sensitivity of the photoreceptor, the half-decay exposure intensity ($E_{\frac{1}{2}}$) was measured by an electrostatic paper analyzer (Model SP-428, manufactured by Kawaguchi Denki Seisakusho). That is, the photoreceptor was charged negatively by a corona discharge under an application voltage such that the corona current was 22 μA and then the photoreceptor was exposed to incandescent light of 5 lux. The exposure intensity ($E_{\frac{1}{2}}$) required for decaying the surface potential to one-half, that is, from $-450$ to $-225$ V was determined to be 0.58 lux.sec. In this case, the photoreceptor had the surface potential of $-746$ V, the dark decay of 23 V/sec and the surface potential of $-5$ V after 10 seconds of exposure (residual potential).

The photoreceptor was then subjected to a repeating cycle of charging, dark decay for 0.4 sec and exposure of incandescent light at 400 lux for 2.0 second, and the characteristics of the photoreceptor after the repeating use were evaluated. After repeating cycles of 2,000 times, the surface potential was 95% of the initial value and the residual potential was −9 V.

EXAMPLE 2

A photoreceptor having a laminated type photosensitive layer was prepared in the same manner as in Example 1 excepting for using 70 parts of N-methyl-3-carbazole carbaldehyde diphenylhydrazone and 2 parts of p-nitrobenzoyloxybenzal malononitrile instead of 4-N,N-diethylbenzaldehyde diphenylhydrazone in the charge carrier transport layer of Example 1 and adjusting the thickness of the charge carrier transport layer to 13 μm. The photoreceptor had the initial sensitivity of 0.65 lux.sec, the surface potential of −618 V, the dark decay of 10 V/sec and the residual potential of −18 V. Further, the surface potential under the condition of corona current at 50 μA was −963 V.

The surface potential after repeating 2,000 cycles was 100.5% of the initial value which means there was no substantial change between the both and it was extremely stable. The residual potential was −38 V. From the measurement of the exposure intensity required for decaying the surface potential to one-half, i.e., from −400 to −200 V as the half-decay exposure intensity, there could not be found any substantial change in the half-decay exposure intensity between the initial and after 2,000 cycles since it was 0.60 lux.sec at the initial time and 0.61 lux.sec after 2,000 cycles.

Figure 8:
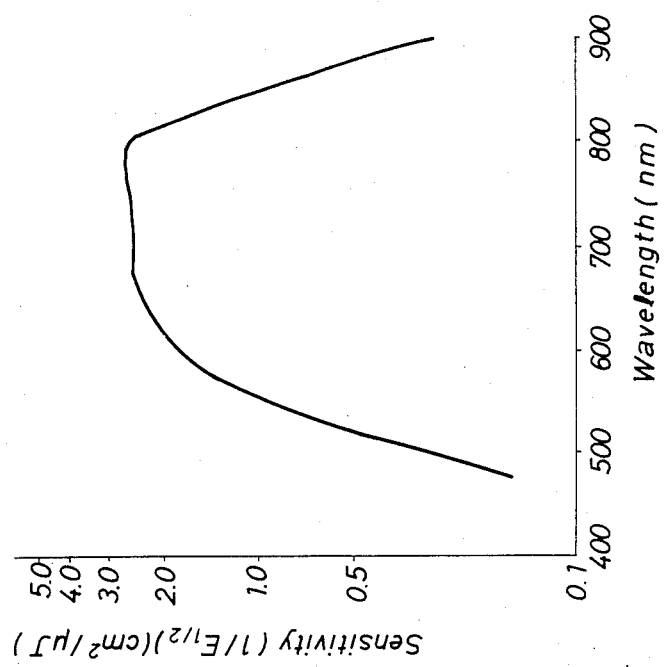
FIG. 8 shows the spectral sensitivity curve of the photoreceptor prepared in Example 2.

The spectral sensitivity was measured under the exposure of a monochromatic light through Shimazu Bausch & Lomb high intensity grating monochrometer. The measured spectral sensitivity curve is shown in FIG. 8. In FIG. 8, the ordinate represents the reciprocal of the half-decay exposure intensity as the sensitivity and the abscissa represents the wavelength. As is apparent from FIG. 8, the sensitivity is substantially the same throughout the semiconductor laser beam region of 750–800 nm, showing that the sensitivity is stable against the lot deviation and the fluctuations of the temperature-dependent lasing wavelength of the semiconductor laser. The half-decay exposure intensity at 800 nm is extremely high as 0.39 μJ/cm$^2$.

As described above, it was found that the oxytitanium phthalocyanine of the specific crystal form (form I) according to this invention had a satisfactory charge acceptance, less dark decay and low residual potential as well as a high sensitivity at the semiconductor laser beam region of 750–800 nm. In addition, the surface potential showed no substantial fluctuation and was extremely stable even after the repeating use.

EXAMPLE 3

A photoreceptor was prepared in the same procedures as in Example 2 except for using the oxytitanium phthalocyanine as prepared in Preparation Example 2 instead of the oxytitanium phthalocyanine of Example 2.

The photoreceptor had the initial sensitivity of 0.69 lux.sec, the surface potential of −605 V, the dark decay of 12 V/sec and the residual potential of −21 V. Further, the surface potential under the condition of the corona current at 50 μA was −930 V. After repeating 2,000 cycles, the surface potential was 100.3% of that at the initial stage, which means it was substantially constant, and the residual potential was −40 V.

As described above, although extremely low diffraction peaks are observed at 6.7° and 7.6° in the X-ray diffraction spectrum of the oxytitanium phthalocyanine in this Example, there were no substantial effect on the electrical properties and the photoreceptor showed an extremely satisfactory performance, only showing the fluctuation within a range of the lot deviation upon preparing the photoreceptor.

EXAMPLE 4

A photoreceptor was prepared in the same manner as in Example 2 except for using the oxytitanium phthalocyanine as prepared in Preparation Example 3 instead of the oxytitanium phthalocyanine of Example 2.

The photoreceptor had the initial sensitivity of 0.77 lux.sec, the surface potential of −595 V, the dark decay of 13 V/sec and the residual potential of −27 V. After repeating 2,000 cycles, the surface potential was 100.0% of that at the initial stage, showing no substantial change.

COMPARATIVE EXAMPLE 1

A photoreceptor was prepared by using oxytitanium phthalocyanine of the crystal form II obtained in Preparation Example 1 instead of the oxytitanium phthalocyanine of Example 2, and the electrical properties thereof were measured. The results are shown in Table 1. As can be seen from the table, the crystal form II had the lower surface potential and the larger dark decay and residual potential as compared with those of the crystal form I according to this invention. Further, the rate of increase in the surface potential was small even if the application voltage (corona current) was increased, showing that the saturation surface potential was low.

The stability of the surface potential has a great effect on the durability of the photoreceptor. Since the level capable of serving to the practical use is considered more than 90% in this evaluation, the sample of this Comparative Example 1 is insufficient for the practical use.

As described above, since the photoreceptor for use in electrophotography according to this invention uses the dispersion layer of the oxytitanium phthalocyanine of the specific crystal form as the charge carrier generation layer, it is a photoreceptor having satisfactory charge acceptance, high sensitivity, low dark decay and residual potential and, particularly, excellent in repeating stability and durability, and thus particularly suitable as the photoreceptor for use in semiconductor laser.

TABLE 1

| | | Electrical properties of photoreceptor | | | | Repeating property Change in the surface potential (%)[*2] |
|---|---|---|---|---|---|---|
| | | Initial property | | | | |
| | | Surface potential (V) | | Sensitivity | Dark decay | Residual potential |
| | Crystal form | 22 μA[*1] | 55 μA[*1] | (lux · sec) | (V/sec) | (V) |
| Example 2 | Form I | −618 | −963 | 0.65 | 10 | −18 | 100.5 |
| Comparative | Form II | −540 | −788 | 0.70 | 34 | −26 | 84.4 |

TABLE 1-continued

| | Electrical properties of photoreceptor | | | | | Repeating property Change in the surface potential (%)[2] |
|---|---|---|---|---|---|---|
| | Initial property | | | | | |
| Crystal form | Surface potential (V) | | Sensitivity (lux · sec) | Dark decay (V/sec) | Residual potential (V) | |
| | 22 μA[1] | 55 μA[1] | | | | |

Example 1

[1]corona current value
[2]ratio of the surface potential after 2,000 cycles to the initial surface potential

COMPARATIVE EXAMPLE 2

A photoreceptor for use in electrophotography was prepared in the same manner as in Example 1 except for using the oxytitanium phthalocyanine as prepared in Preparation Comparative Example 4 instead of the oxytitanium phthalocyanine as prepared in Preparation Example 1.

$E_{178}$ value was determined to be 1.0 lux.sec. The surface potential was −520 V, the dark decay was 21 V/sec and the surface potential after 10 seconds of exposure was −27 V. Further, the surface potential at the corona current of 50 μA was −770 V.

Then, the repeating property of the photoreceptor was evaluated by the cycle of charging, dark decay for 0.4 sec and exposure with incandescent light at 400 lux for 2.0 sec. After repeating 2,000 cycles, the surface potential was 85% of the initial stage and the residual potential was −54 V.

What is claimed is:

1. A crystalline oxytitanium phthalocyanine which shows intense diffraction peaks at Bragg angles ($2\theta \pm 0.2°$) of 9.3°, 10.6°, 13.2°, 15.1°, 15.7°, 16.1°, 20.8°, 23.3°, 26.3° and 27.1° in the X-ray diffraction spectrum, the intensity of the diffraction peak at Bragg angle of 26.3° being most strong and the intensity of the diffraction peaks at Bragg angles between 4°–8° being less than 5% of the intensity of the diffraction peak at Bragg angle of 26.3°.

2. A photoreceptor for use in electrophotography, comprising at least a charge carrier generation layer in which an oxytitanium phthalocyanine is dispersed in a binder polymer and a charge carrier transport layer laminated thereon, wherein the oxytitanium phthalocyanine shows intense diffraction peaks at Bragg angles ($2\theta \pm 0.2°$) of 9.3°, 10.6°, 13.2°, 15.7°, 16.1°, 20.8°, 23.3°, 26.3° and 27.1° in the X-ray diffraction spectrum and the intensity of the diffraction peak at Bragg angle of 26.3° is most strong and the intensity of the diffraction peaks at Bragg angles between 4°–8° is less than 5% of the intensity of the diffraction peak at Bragg angle of 26.3°.

* * * * *

UNITED STATES PATENT AND TRADEMARK OFFICE
CERTIFICATE OF CORRECTION

PATENT NO. : 4,664,997
DATED : May 12, 1987
INVENTOR(S) : Tetsumi Suzuki et al

It is certified that error appears in the above-identified patent and that said Letters Patent are hereby corrected as shown below:

In the legend [30] under Foreign Application Priority Data insert --Nov. 1, 1984 [JP] Japan. . . . . .59-230982--

Signed and Sealed this

First Day of December, 1987

Attest:

DONALD J. QUIGG

Attesting Officer      Commissioner of Patents and Trademarks